United States Patent [19]

Gupta

[11] Patent Number: 5,443,771
[45] Date of Patent: Aug. 22, 1995

[54] CERAMIC FIBRE AND PROCESS THEREFOR

[76] Inventor: Sankar D. Gupta, c/o Electrofuel Manufacturing Co. Unit 10, 37 Hanna Ave., Toronto, Ont., Canada, M6K 1W8

[21] Appl. No.: 183,829

[22] Filed: Jan. 21, 1994

Related U.S. Application Data

[63] Continuation-in-part of Ser. No. 944,941, Sep. 15, 1992, abandoned.

[51] Int. Cl.⁶ ............... C04B 35/655; C04B 35/58
[52] U.S. Cl. ..................... 264/82; 501/95; 501/96; 501/102; 264/164; 264/177.11; 423/289; 423/297; 423/411
[58] Field of Search ............ 501/95, 96, 102; 423/289, 297, 296, 287, 411; 264/82, 177.11, 177.17, 177.18, 177.19, 211.11, 211.12, 211.13–211.14, DIG. 25, 164

[56] References Cited

U.S. PATENT DOCUMENTS

| | | | |
|---|---|---|---|
| 2,980,510 | 4/1961 | Berry | 501/95 |
| 3,657,089 | 4/1972 | Takahashi et al. | 501/95 |
| 4,282,155 | 8/1981 | Hoekje | 501/96 |
| 5,059,563 | 10/1991 | Khazai et al. | 501/96 |
| 5,135,895 | 8/1992 | Frechette et al. | 501/95 |

*Primary Examiner*—Mark L. Bell
*Assistant Examiner*—C. M. Bonner

[57] ABSTRACT

A process is described for producing ceramic fibres composed of titanium boride, zirconium boride or hafnium boride. The boride fibres are obtained by reacting a boron oxide precursor fibre with a titanium halide, zirconium halide or hafnium halide gas in the presence of hydrogen. Ceramic titanium, zirconium or hafnium nitride fibres may also be produced by the process, by means of the additional presence of nitrogen gas in the gas phase. The process is conducted at temperature higher than 500° C.

14 Claims, 4 Drawing Sheets

CERAMIC FIBRE AND PROCESS THEREFOR

This application is a continuation-in-part application of my application U.S. Ser. No. 07/944,941, filed Sep. 15, 1992, now abandoned.

FIELD OF THE INVENTION

This invention relates to the field of fibres, more specifically the field of predominantly non-oxide ceramic fibres.

BACKGROUND TO THE INVENTION

Fibres are often combined with other materials to form composites thereby increasing the mechanical strength of such materials. Fibres may be made of inorganic or organic material or sometimes a combination of the two. Whiskers are sometimes considered to be synonymous with fibres, but it is generally understood that whiskers have smaller diameter and shorter lengths than fibres.

In the following discussion fibres are considered to be elongated substances having chemically substantially homogeneous composition, and having an average diameter and an average length. The ratio of the average diameter of the type of fibre under consideration, to its average length is usually substatially greater than 5. Such ratio is sometimes referred to as aspect ratio. It is considered that a fibre may be a single elongated substance forming a relatively long continuous thread, or it may consist of several shorter fibres spun or stuck together to provide a fibre of more substantial length.

Ceramic materials are characterized by having high melting points, are often refractory and are generally resistant to oxidation and corrosion. Ceramic fibres and whiskers have desirable properties such as high melting point, substantial physical strength in relation to their weight, relatively high modulus, good shape retention, resistance to oxidation, moreover ceramic fibres may often be obtained from relatively inexpensive materials. There are many structural applications where ceramic fibres can be usefully incorporated. For example, ceramic fibres such as alumina fibres, are frequently used for reinforcing materials when properties such as those listed above, are required. The average diameter or core dimension of desirable ceramic fibres range from a few microns, or even a fraction of a micron, to as wide as a millimeter.

In some instances of commercial utilization of fibres high strength combined with low electrical resistivity are required. Some transition metal borides and nitrides such as titanium boride, hafnium boride, zirconium boride, as well as titanium nitride, hafnium nitride and zirconium nitride, are ceramics known to have low electrical resistivity, and hence the above transition metal boride and nitride fibres are suitable and desirable in such commercial applications.

There are conventional methods for obtaining oxide, carbide and nitride fibres, by extruding or spinning ceramic oxide, carbide or nitride based particles carried in a viscous solution or by a low melting point organic substance. The extruded or spun fibres containing ceramic particles are subsequently subjected to heat treatment to evaporate the solvent and/or decompose the organic carrier. The extruded or spun fibres prior to the heat treatment are sometimes referred to as precursor fibres. It is generally observed that the elimination of the carrier substance leaves voids in the ceramic fibres so obtained, thus the coherence of the ceramic fibres produced by conventional methods is usually low, and consequently the mechanical strength and modulus of such fibres are low or only moderate. In order to increase the strength and coherence of ceramic fibres obtained by conventional methods, high temperature sintering, such as in excess of 1700° C., is required. High temperature sintering process steps are likely to increase the cost of production of conventional ceramic fibres substantially.

It is also known to grow ceramic fibres between electrodes in an electrical field, but such methods are unlikely to produce ceramic fibres in lengths and quantities which are required in commercial utilization.

Pyrolysis of organic fibres or similar carbon rich filaments to provide carbon fibres has been practised for several decades. It is known to obtain silicon carbide fibres, for example, by a process in which polycarbosilanes are subjected to pyrolysis.

Yoshiharu Kimura in U.S. Pat. No. 5,061,469, describes a process for producing boron nitride fibres by reacting an amine with a borazine compound. It is also known to obtain a composite fibre by providing a coating of titanium boride on tungsten fibres.

There is a need for a method to produce coherent and substantially pore-free transition metal nitride and boride fibres without the application of expensive high temperature sintering steps, which could be utilized in obtaining the fibres in commercially required lengths and quantities.

By one aspect of the invention described hereinbelow, a method is provided whereby polycrystalline titanium boride, hafnium boride and zirconium boride fibres are obtained by reacting continuous boron trioxide precursor fibres at moderately high temperature, in a non-oxidizing atmosphere, with a transition metal halide and hydrogen, which are optionally carried by an inert gas.

By another aspect of the present invention a method is described whereby polycrystalline titanium nitride, zirconium nitride and/or hafnium nitride fibres are obtained by reacting continuous boron trioxide precursor fibres at moderately high temperature, in a non-oxidizing atmosphere, with a transition metal halide and nitrogen gas, in the presence of hydrogen.

DETAILED DESCRIPTION OF THE INVENTION

Figure 1:
FIGS. 1 and 2 show SEE photographs of $TiB_2$ fibres and cross-section of a $TiB_2$ fibre.

The preferred embodiment of the present invention will now be described by reference to the Figures.

The present method for obtaining a titanium boride ($TiB_2$) ceramic fibre utilizes a boron oxide ($B_2O_3$) precursor fibre. It is to be understood that a similar method may be practised in order to obtain zirconium and hafnium boride ceramic fibres by the substitution of the appropriate transition metal halide in the subsequent reaction with the precursor fibre.

A precursor fibre is defined in the scope of the present invention, as that which has similar shape and dimension, more particularly similar diameter and length, as the boride fibre to be obtained. The precursor fibre serves as a temporary substrate during the formation, and is converted substantially in its entirety to the desired transition metal boride or transition metal nitride, as the case may be. The precursor fibre utilized by the present process contains no organic component to be eliminated in a subsequent process step.

Boron oxide of suitable purity is melted by appropriate means and kept above its melting point (460° C.). Fibres of boron oxide are then obtained by pulling a continuous thread from the molten boron oxide, or forcing the melt through a small aperture, or similar conventional techniques producing coherent and usually continuous fibres of boron oxide. The diameter may be as small as a fraction of a micron ($10^{-6}$m), ranging to a diameter of a millimeter. The length of the fibre is determined by convenience.

The boron oxide fibre so obtained may be allowed to cool and solidify, or alternatively, is immediately reacted with a gaseous substance which forms an additive compound on the surface of the boron oxide. The requirement of the additive compound formed temporarily, is that it has a melting point which is notably higher than the melting point of the boron oxide, thereby encasing the molten boron oxide and stabilizing the shape of the molten oxide above its melting point. The gaseous substance is preferably ammonia gas or an ammonia derivative, or a mixture of nitrogen and hydrogen. The compound preferably forms a skin of sub-microscopic thickness around the precursor fibre. The thickness of the skin temporarily encasing the boron oxide is of no significance, however it is important that the skin made of the temporary additive compound be continuous.

The boron oxide fibre formed as a continuous filament may be encased while still hot, or the cooled fibre, either as a long continuous filament or in the shape of shorter pieces of fibre may be reheated, and encased by a skin of an additive compound formed at a temperature initially below the melting point of $B_2O_3$.

In one of the preferred embodiments ammonia gas is passed over the boron oxide fibre at a slightly lower temperature than its melting point. The ammonia gas may be carried by an inert gas or, as mentioned above, it may also be an appropriate mixture of nitrogen and hydrogen.

The boron oxide fibre which is now encased, that is its shape has been stabilized, is subsequently reacted with a titanium halide bearing gas at a temperature above the melting point of boron oxide. The preferred halide is titanium tetrachloride ($TiCl_4$), but titanium bromide ($TiBr_4$), titanium iodide ($TiI_4$) may also be used. The reaction between the stabilized boron oxide precursor fibre and titanium tetrachloride takes place in the presence of hydrogen to form titanium boride, hydrogen chloride and water. The reaction may be represented by the following equation:

$$B_2O_3 + TiCl_4 + 5H_2 \rightarrow TiB_2 + 4HCl + 3H_2O \quad (1)$$

The reacting gases may be carried by an inert gas such as for example, argon or helium. The reaction temperature may conveniently be 1000°–1200° C., but it may be as low as 500° C., or as high as 1400° C., dictated by convenience only.

The diameter of the titanium fibre obtained by the present process is governed by the diameter of the boron oxide precursor fibre. The length of the titanium boride fibres is decided by convenience. Irrespective of the diameter and length, the fibres will be polycrystalline and substantially pore-free.

The above process may be conducted as a continuous process or as a batch process.

Zirconium boride fibre may be obtained by reacting the encased boron oxide precursor fibre with a zirconium halide gas in the presence of hydrogen optionally diluted with an inert gas. The by-product gases will be hydrogen halide gas and water, as in the above reaction (1).

Similarly, hafnium boride fibre may be obtained by reacting a hafnium halide gas with boron oxide precursor fibre in the presence of hydrogen and optionally in an inert gas, under conditions similar to those described hereinabove.

Essentially the same process is used to obtain ceramic nitride fibres, however, the additional presence of nitrogen gas in the reacting gases is required. Thus titanium nitride is obtain by reacting the encased boron oxide precursor fibre at a temperature above the melting point of boron oxide with a titanium halide gas, such as titanium tetrachloride, in the presence of hydrogen and nitrogen, according to the equation summarizing the reactions:

$$B_2O_3 + 2TiCl_4 + 4H_2 + N_2 \rightarrow 2TiN + 2BCl_3 + 2HCl + 3H_2O \quad (2)$$

The reacting titanium tetrachloride, hydrogen and nitrogen may be carried by argon or a similar inert gas, such as helium, but this is not essential.

As it has been referred to hereinabove, zirconium nitride fibres or hafnium nitride fibres may be obtained from a shape-stabilized boron oxide precursor fibre by utilizing a zirconium halide or a hafnium halide gas in the presence of hydrogen and nitrogen.

It is preferable that the gases reacting with the boron oxide fibre are flowing, in order to diminish the likelihood of hydrolysis of the reaction by-products. The presence of an oxygen containing gas in the reaction zone is preferably kept at a minimum, so that titanium dioxide formation/or zirconium dioxide or hafnium dioxide as the case may be/as a side-product is avoided and the direction of the reaction is not reversed, resulting in boron trioxide reformation.

In the following, working examples of the process described hereinabove, are provided.

EXAMPLE 1

About 500 grams of pre-dried technical grade boron oxide ($B_2O_3$) was heated above its melting point, that is above 460° C. Continuous strands of fibres were pulled by means of a take-up wheel from the molten boron oxide and the obtained fibres were allowed to cool below the melting point. The strands of fibres obtained were about 4–6 μm in diameter, and were cut up to form bundles of about 30 cm (12″) long fibres.

The bundle of boron oxide precursor fibre was then suspended and slowly heated to 700° C. in an atmosphere of ammonia in a vertical furnace. When the temperature of 700° was reached, the atmosphere of the furnace was changed to a flowing atmosphere of hydrogen gas diluted with argon and saturated with titanium tetrachloride. The partial pressure of hydrogen in the mixture was close to 1 atm.

The bundle of fibres was kept in the above atmosphere at around 1000° C. for the period of 4–5 hours to complete the conversion of boron oxide to titanium boride. The completion of the reaction was indicated by the colour of the fibres changing to black. The fibres were subsequently allowed to cool in the flowing gas atmosphere of the same composition.

Figure 2:
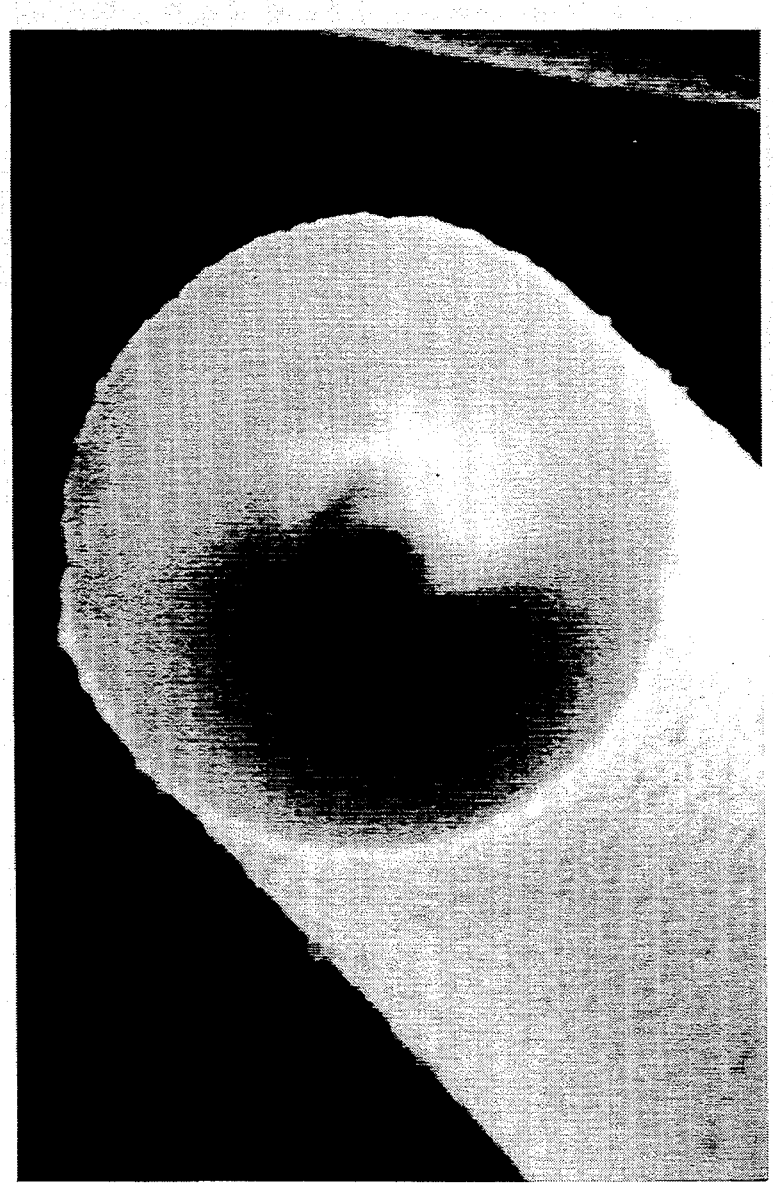

FIG. 1 shows a SEM photograph of the titanium boride fibres so obtained. The SEM photograph of FIG. 2 shows the cross-section of a titanium boride fibre broken in a plane perpendicular to its length, indicating that the fibre has homogeneous composition through its cross-section.

It is to be noted that the above example utilized hydrogen at close to 1 atm. partial pressure in the reaction, but the partial pressure of the hydrogen may be reduced to 0.5 atm. by dilution with an inert gas, such as argon or helium.

EXAMPLE 2

Boron oxide fibres were heated and encased in a composition having a melting point notably higher than that of boron trioxide, as described in Example 1, by slowly heating the precursor fibres to 700° C. in an ammonia gas containing atmosphere. The furnace atmosphere was then changed to a flowing gas mixture containing hydrogen and nitrogen in a ratio of 2:1 which has been saturated with titanium tetrachloride ($TiCl_4$). The furnace temperature was further increased to about 1200° C. and the treatment continued for 4-5 hours, until the colour of the fibres turned to a golden metallic colour, which is the colour of TiN. The fibres were then allowed to cool. The appearance of the fibres under electronmicroscope was similar to that of $TiB_2$ shown on FIGS. 1 and 2.

The fibres obtained by the process described in Example 1 and 2 illustrate the preparation of titanium boride and titanium nitride, respectively. It should be clear to a person skilled in the art, that titanium tetrachloride gas may be replaced by $TiBr_4$ and/or $TiI_4$ and the products obtained would be the same.

Ceramic fibres containing a mixture of titanium boride and titanium nitride may be obtained by adjusting the ratio of hydrogen and nitrogen in the mixture appropriately.

In Examples 1 and 2, the process was conducted in a batch mode. The process could be adapted to a continuous mode by using appropriate equipment and technology known to a skilled person.

EXAMPLE 3

Figure 3:
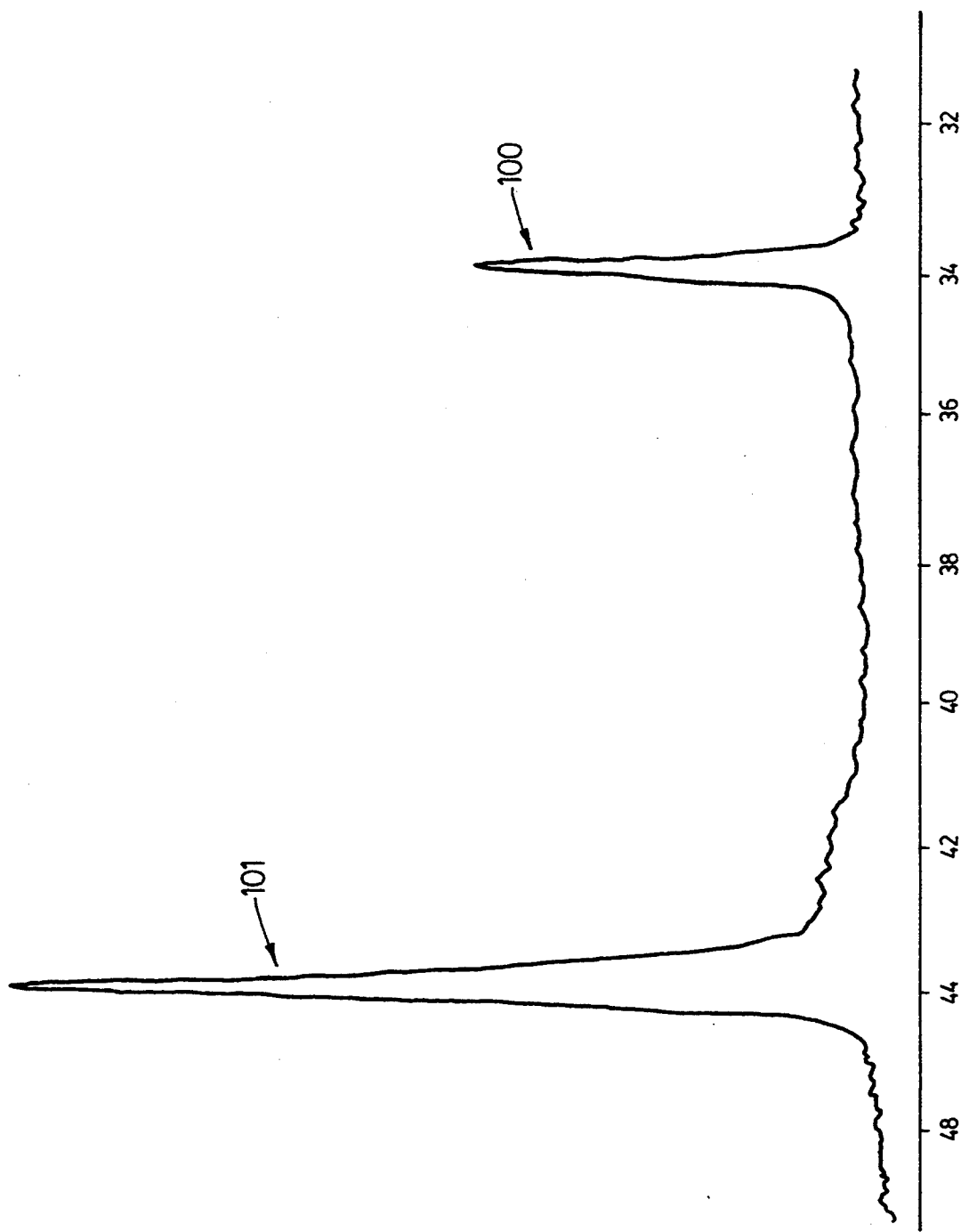
FIG. 3 is an X-ray diffractogram of the $TiB_2$ fibre obtained according to the present invention.

The identification of titanium boride obtained in Example 1 was conducted by X-ray diffraction. The X-ray diffraction was carried out by a Philips X-ray machine type PW 1120/60, at 40 kV, at $\frac{1}{4}$°/min. rate, utilizing copper $K\alpha$ radiation. The X-ray diffractrogram obtained, indicating the most characteristic peaks of $TiB_2$, is shown on FIG. 3. The d-values calculated correspond to the d-values listed as those of $TiB_2$ in the ASTM Index.

The electrical resistivity of the $TiB_2$ fibres obtained in Example 1 was measured by conventional means. The resistivity of bundles of approximately 100 strands of fibres were measured having an average diameter of 5 $\mu m$ and having lengths of 5.2 cm. It was found that the resistivity of the above bundle of fibres was 0.5 ohm cm. This value compares very well with the bulk resistivity of titanium boride, having taken into consideration the fibrous nature of the material on which the measurement was conducted.

The modulus of the titanium boride fibres obtained by the process of this invention ranged between 35-68 GPa. The average tensile strength of the fibres was found to be 400 MPa.

Thus it can be shown that strong, high conductivity ceramic fibres, made substantially of $TiB_2$ can be obtained by the process of the present invention.

The above modulus and tensile strength values were measured on the titanium boride fibres obtained in Example 1. By modifying the reaction temperature, extending duration of the reaction period and varying other preparative conditions such as gas flow rate, the physical characteristics of the fibres may be adjusted to suit different commercial requirements.

EXAMPLE 4

Figure 4:
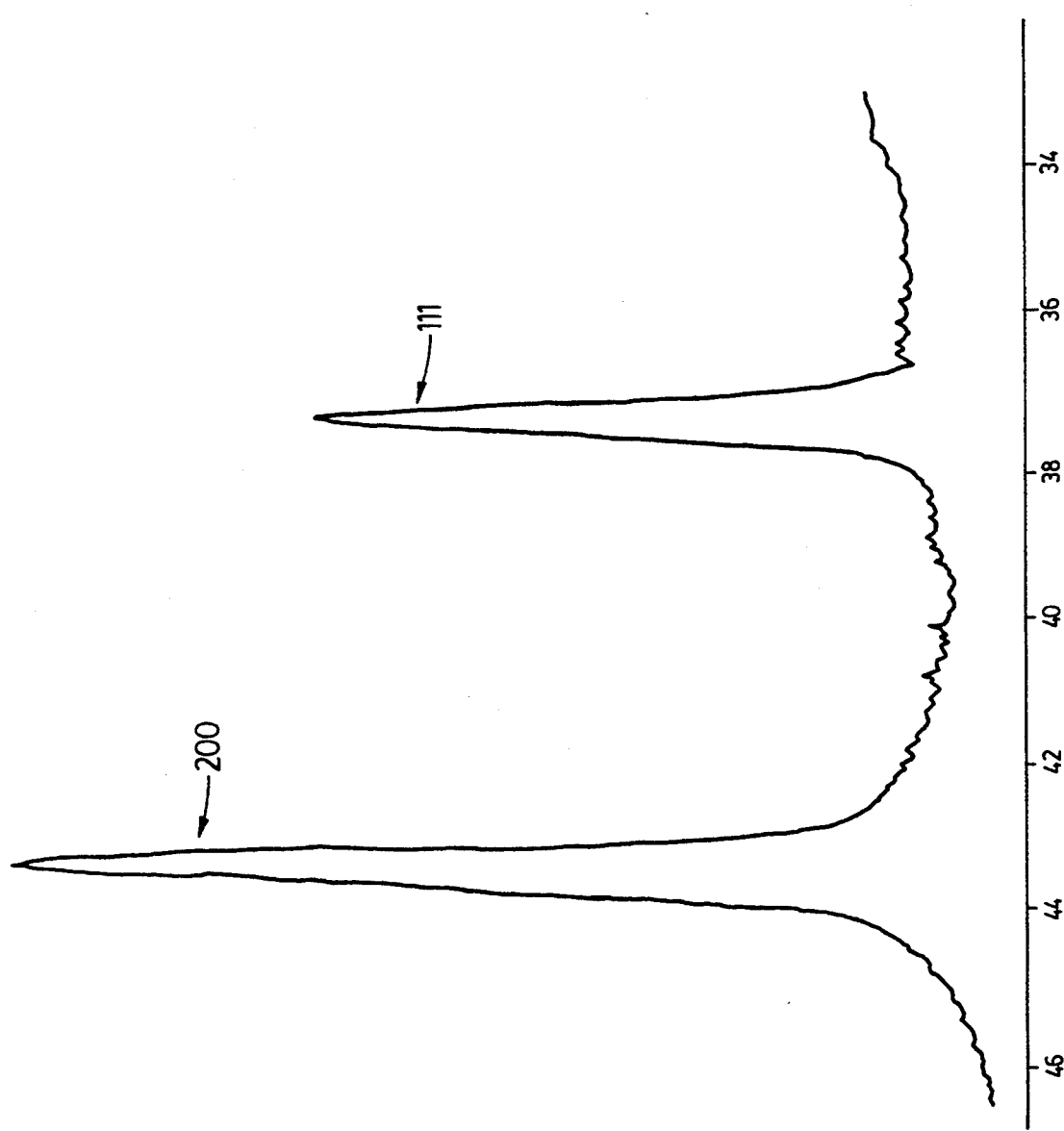
FIG. 4 is an X-ray diffractogram of TiN fibre obtained according to the present invention.

The titanium nitride fibre obtained as described in Example 2 was subjected to X-ray diffraction analysis conducted on the same Philips equipment as used in Example 3. The diffractogram indicating that the fibre is composed of substantially titanium nitride, is shown on FIG. 4. The calculated d-values were found to correspond to those listed in the ASTM Index as TiN.

The electrical resistivity of a bundle of 100 fibres with average diameter of 5$\mu$, and having average length of 1.5 cm, was measured to be 0.05 ohm.cm.

The modulus of the fibres ranged between 27-46.5 GPa and the average tensile strength of the fibres was found to be 310 MPa.

The physical characteristics of the titanium nitride fibres may be adjusted to requirements in some measure by modifying the preparative conditions with respect to temperature, duration of the reaction, flowrate of the gases, as a person skilled in the art will readily understand.

The titanium, zirconium and hafnium boride and nitride fibres made in accordance with the present process are homogenous, dense, coherent, and by virtue of being produced by reacting a liquid with gaseous reactants, substantially pore-free. The reactions are conducted at moderately high temperatures. The fibres are obtained in the absence of separate high temperature sintering process steps. The present process for obtaining nitride and boride fibres may be readily adapted to production on a commercial scale at relatively low production costs.

The ceramic fibres obtained by the process of the present invention may be utilized in composite materials, in the reinforcement of materials capable of resisting high temperatures wherein electrical conductivity is an additional requirement; and in similar applications in which ceramic fibres may be utilized.

Although the present invention has been described with reference to the preferred embodiment, it is to be understood that modifications and variations may be resorted to without departing from the spirit and scope of the invention, as those skilled in the art readily understand. Such modifications and variations are considered to be within the purview and scope of the invention and the appended claims.

I claim:

1. A process for obtaining a ceramic fibre comprised of titanium boride, zirconium boride or hafnium boride, comprising the steps of:
   a) heating boron oxide above its melting point and producing a precursor fibre of boron oxide by a method selected from the group consisting of pulling a thread of molten boron oxide, forcing the molten boron oxide through an aperture and spinning the molten boron oxide, said precursor fibre having a shape defined by the cross-section of said precursor fibre;
b) stabilizing the shape of the boron oxide fibre so obtained by encasing said boron oxide precursor fibre in a continuous skin made of a boron oxide containing substance, said boron oxide containing substance having a melting point which is above the melting point of said boron oxide;
c) reacting said encased boron oxide precursor fibre at a temperature above the melting point of boron oxide with a gas comprising hydrogen and a gaseous halide selected from the group consisting of titanium halide zirconium halide and hafnium halide, to yield a homogeneous boride fibre, and
d) allowing the boride fibre so formed to cool.

2. A process for obtaining a ceramic fibre comprised of titanium nitride, zirconium nitride or hafnium nitride, comprising the steps of:
a) heating boron oxide above its melting point and producing a precursor fibre of boron oxide by a method selected from the group consisting of pulling a thread of molten boron oxide, forcing the molten boron oxide through an aperture and spinning the molten boron oxide, said precursor fibre having a shape defined by the cross-section of said precursor fibre;
b) stabilizing the shape of the boron oxide fibre so obtained by encasing said boron oxide precursor fibre in a continuous skin made of a boron oxide containing substance, said boron oxide containing substance having a melting point which is above the melting point of said boron oxide;
c) reacting said encased boron oxide precursor fibre at a temperature above the melting point of boron oxide with a gas comprising hydrogen, nitrogen and a gaseous halide selected from the group consisting of titanium halide, zirconium halide and hafnium halide, to yield a homogeneous nitride fibre, and
d) allowing the boride fibre so formed to cool.

3. A process as claimed in claim 1, wherein said boron oxide precursor fibre has an uniform, substantially circular cross-section having diameter ranging from 4 to 6 $\mu$m, and the diameter of said homogeneous boride fibre obtained in step c) corresponds to the diameter of said precursor fibre.

4. A process as claimed in claim 2, wherein said boron oxide precursor fibre has an uniform, substantially circular cross-section having diameter ranging from 4 to 6 $\mu$m, and the diameter of said homogeneous nitride fibre obtained in step c) corresponds to the diameter of said precursor fibre.

5. A process as claimed in claim 1, wherein said boron oxide containing substance encasing said boron oxide precursor fibre is obtained by passing an encasing gas selected from the group consisting of ammonia, ammonia derivative and a mixture of nitrogen and hydrogen, over said boron oxide precursor fibre.

6. A process as claimed in claim 2, wherein said boron oxide containing substance encasing said boron oxide precursor fibre is obtained by passing an encasing gas selected from the group consisting of ammonia, ammonia derivative and a mixture of nitrogen and hydrogen, over said boron oxide precursor fibre.

7. A process according to claim 1, wherein said gas reacting with said encased boron oxide precursor fibre in step c) additionally comprises an inert gas selected from the group consisting of argon and helium.

8. A process according to claim 2, wherein said gas reacting with said encased boron oxide precursor fibre in step c) additionally comprises an inert gas selected from the group consisting of argon and helium.

9. A process according claim 3, wherein the temperature of reacting said encased boron oxide precursor fibre with said gas comprising hydrogen and said gaseous halide, ranges between 600° and 1400° C.

10. A process according to claim 4, wherein the temperature of reacting said encased boron oxide precursor fibre with said gas comprising hydrogen, nitrogen and said gaseous halide, ranges between 600° and 400° C.

11. A process according to claim 1, conducted in a continuous mode.

12. A process according to claim 1, conducted in a batch mode.

13. A process according to claim 2, conducted in a continuous mode.

14. A process according to claim 2, conducted in a batch mode.

* * * * *